United States Patent
Kumazawa et al.

(10) Patent No.: US 6,577,446 B2
(45) Date of Patent: Jun. 10, 2003

(54) COLORING STRUCTURE FOR PRODUCING COLORS

(75) Inventors: Kinya Kumazawa, Kanagawa (JP); Hiroshi Tabata, Yokohama (JP); Masahiko Yamanaka, Kanagawa (JP); Toshihiko Sada, Kanagawa (JP)

(73) Assignees: Nissan Motor Co., Ltd., Yokohama (JP); Tanaka Kikinzoku Kogyo K.K., Tokyo (JP); Teijin Limited, Osaka (JP)

( * ) Notice: Subject to any disclaimer, the term of this patent is extended or adjusted under 35 U.S.C. 154(b) by 13 days.

(21) Appl. No.: 09/870,727

(22) Filed: Jun. 1, 2001

(65) Prior Publication Data

US 2001/0053028 A1 Dec. 20, 2001

(30) Foreign Application Priority Data

Jun. 7, 2000 (JP) ........................................ 2000-170820

(51) Int. Cl.$^7$ .............................. G02B 1/10; G02B 5/22; B44C 5/06
(52) U.S. Cl. ....................... 359/577; 359/580; 359/584; 359/586; 359/588; 359/589; 428/38; 428/207
(58) Field of Search ................................ 359/577, 584, 359/585, 586, 588; 428/200, 201, 202, 206, 207, 403

(56) References Cited

U.S. PATENT DOCUMENTS

| | | | |
|---|---|---|---|
| 3,711,176 A | 1/1973 | Alfrey, Jr. et al. | |
| 5,407,738 A | 4/1995 | Tabata et al. | 428/229 |
| 5,472,798 A | 12/1995 | Kumazawa et al. | 428/690 |
| 5,571,624 A | * 11/1996 | Phillips et al. | 428/403 |
| 5,849,383 A | 12/1998 | Kumazawa et al. | 428/38 |
| 5,908,593 A | 6/1999 | Kikutani et al. | 264/177.13 |
| 6,051,513 A | 4/2000 | Kumazawa et al. | 442/301 |
| 6,114,018 A | * 9/2000 | Phillips et al. | 428/200 |

FOREIGN PATENT DOCUMENTS

| | | |
|---|---|---|
| EP | 0 926 272 | 6/1999 |
| EP | 1 008 440 | 6/2000 |

* cited by examiner

*Primary Examiner*—Audrey Chang
(74) *Attorney, Agent, or Firm*—Foley & Lardner

(57) ABSTRACT

A coloring structure includes a light-reflecting base, a brilliant layer placed on the base, and transparent brilliant units contained in the brilliant layer, each brilliant unit including an alternate lamination of at least two polymers having different refractive indexes, the lamination producing interfered light resulting from reflection and interference of light and transmitted light resulting from transmission of light, each brilliant unit controlling interfered and transmitted lights. The coloring structure is provided with a coloring mechanism for producing at least an interference color resulting from interfered light, a first object color resulting from reflection of transmitted light produced by the base, and a second object color resulting from reflection of incident light produced by the base without striking any brilliant units.

14 Claims, 9 Drawing Sheets

FIG.10

| DESIGNATION | | DIMENSIONAL RATIO OF BRILLIANT UNIT | | | CONTENT (%) | LAYERS WITH CLEAR LAYERS IN PARENS. | APPEARANCE | TONE | BRILLIANCE | LIGHTNESS (V) | CHROMA (C) | REMARKS |
|---|---|---|---|---|---|---|---|---|---|---|---|---|
| | | A | B | L | | | | | | | | |
| EMBODIMENTS | 1 | 1 | 4~5 | 15~20 | 10 | 1(0) | GOOD | BLUE TO BLUE-GREEN | 3 | 6 | 6.1 | FIG.7A |
| | 2 | 1 | 4~5 | 15~20 | 10 | 2(1) | GOOD | BLUE TO BLUE-GREEN | 4 | 6.2 | 6.3 | FIG.7B |
| | 3 | 1 | 4~5 | 15~20 25~35 | 10 | 2(0) | GOOD | BLUE TO GREEN | 4 | 6.1 | 6.3 | FIG.7C |
| | 4 | 1 | 4~5 | 15~20 25~35 | 10 | 3(1) | GOOD | BLUE TO GREEN | 5 | 6.1 | 6.3 | FIG.7D |
| | 5 | 1 | 4~5 | 15~20 25~35 | 10 | 3(1) | GOOD | BLUE TO GREEN | 4 | 6.1 | 6.2 | FIG.7E |
| | 6 | 1 | 4~5 | 15~20 25~35 | 10 | 4(2) | GOOD/ EXCELLENT | BLUE TO GREEN | 5 | 6.2 | 6.3 | FIG.7F |
| | 7 | 1 | 2~3 | 15~20 | 10 | 1(0) | GOOD | BLUE TO BLUE-GREEN | 3 | 6.3 | 6.1 | FIG.7A |
| | 8 | 1 | 4~5 | 1~3 | 10 | 1(0) | GOOD | LIGHT BLUE TO BLUE | 3 | 6.4 | 6.7 | FIG.7A |
| | 9 | 1 | 4~5 | 15~20 | 1 | 1(0) | GOOD | LIGHT BLUE TO BLUE | 3 | 6 | 6.5 | FIG.7B |
| | 10 | 1 | 4~5 | 15~20 | 28 | 2(1) | GOOD/ EXCELLENT | BLUE TO GREEN | 4 | 6.8 | 6.8 | FIG.7B |
| | 11 | 1 | 4~5 | 15~20 | 28 | 2(0) | GOOD | BLUE TO GREEN | 4 | 7.1 | 6.9 | FIG.2A |
| | 12 | 1 | 4~5 | 15~20 | 28 | 2(1) | GOOD | BLUE TO BLUE-GREEN | 4 | 7.3 | 6.9 | |
| COMPARATIVE EXAMPLES | 1 | 1 | 4~5 | 15~20 | 10 | 2(1) | POOR | LIGHT BLUE | 2 | 4.8 | 5.1 | |
| | 2 | 1 | 4~5 | 15~20 | 10 | 2(1) | BAD | LIGHT BLUE | 2 | 5.2 | 5.1 | |
| | 3 | 1 | 4~5 | 15~20 | 10 | 1(0) | GOOD | LIGHT BLUE | 1 | 5.3 | 5.4 | |

COLORING STRUCTURE FOR PRODUCING COLORS

BACKGROUND OF THE INVENTION

The present invention relates to a brilliant-layer structure and an ornamental structure that are formable in any flattened shapes such as plate-like, sheet-like and film-like shapes, and are applicable, for example, to the surface of vehicles for automobile, train, etc., house furnishings such as furniture and electric apparatus, construction material, and sporting goods. More particularly, the present invention relates to a coloring structure for producing colors, which provides not only hue varying with the angle, but higher level of brilliance, lightness and saturation.

Generally, final coating for motor vehicles is in the form of a solid-color, metallic-color or pearl-color coating. The solid-color coating produces a predetermined tint by a color pigment. The metallic-color coating contains a color pigment and fine Al pieces to provide not only a color of the color pigment, but a design quality with sparkle due to irregular reflection of light produced by the Al pieces. The pearl-color coating includes a color-base coating and a transparent mica-base paint containing mica pieces applied thereon to provide not only sparkle like the metallic-color coating generated under the action of light reflected by a mica-base coating and light reflected by the color-base film, but softer reflected light than that of the metallic-color coating due to interference by the mica pieces. Recently, the use of special mica allows creation of a design quality with iridescence having hue varying with the angle.

Also available are a design seal, a marking film for forming stripes and logo mark, a sticker, etc. of light-reflecting material to be placed on the surface of various objects. Moreover, in various applications other than automotive coating, such as high-grade bottle/container and panel for office automation apparatus, household electrical appliance or the like, a three-layer structure having a color-base layer, a pearl-mica layer and a transparent skin layer placed in this order is available for a surface ornament for press-blow, blow-injection, bubble-blow molding, etc.

SUMMARY OF THE INVENTION

As described above, in recent years, there is a wide diversity of a surface ornament of various industrial goods such as automotive vehicle. Under such circumstances, there still remains development of new materials to enable a surface structure with novel design quality that is different from the metallic-color and pearl-color coatings.

It is, therefore, an object of the present invention to provide a new coloring structure for producing a color, which provides not only hue varying with the angle, but significantly enhanced level of brilliance, lightness and saturation.

The present invention generally provides a structure for producing colors by reflection and interference of a light incident thereon, comprising:

a base that reflects the light to an incident side;

a brilliant layer placed on the base; and a plurality of transparent brilliant units dispersedly contained in the brilliant layer, each brilliant unit comprising an alternate lamination of at least two polymers having different refractive indexes, the alternate lamination producing an interfered light resulting from reflection and interference of the light and a transmitted light resulting from transmission of the light, each brilliant unit controlling the interfered light and the transmitted light, whereby the structure is provided with a coloring mechanism for producing at least an interference color resulting from the interfered light, a first object color resulting from reflection of the transmitted light produced by the base, and a second object color resulting from reflection of the light produced by the base without striking any brilliant units.

One aspect of the present invention is to provide a structure for producing colors by reflection and interference of a light incident thereon, comprising:

a first base that reflects the light to an incident side;

a second base placed on the first base, the second base having light transparency;

a brilliant layer placed on the second base; and a plurality of transparent brilliant units dispersedly contained in the brilliant layer, each brilliant unit comprising an alternate lamination of at least two polymers having different refractive indexes, the alternate lamination producing an interfered light resulting from reflection and interference of the light and a transmitted light resulting from transmission of the light, each brilliant unit controlling the interfered light and the transmitted light, whereby the structure is provided with a coloring mechanism for producing at least an interference color resulting from the interfered light, a first object color resulting from reflection of the transmitted light produced by an interface between the brilliant layer and the second base, a second object color resulting from reflection of the transmitted light produced by the first base, a third object color resulting from reflection of the light produced by the interface without striking any brilliant units, and a fourth object color resulting from reflection of the light produced by the first base without striking any brilliant units.

BRIEF DESCRIPTION OF THE DRAWINGS

The other objects and features of the present invention will become apparent from the following description with reference to the accompanying drawings wherein:

FIG. 10 is a table illustrating the results of evaluations of the performance for the coloring structures in the embodiments and comparative examples.

DETAILED DESCRIPTION OF THE INVENTION

Figure 1A:
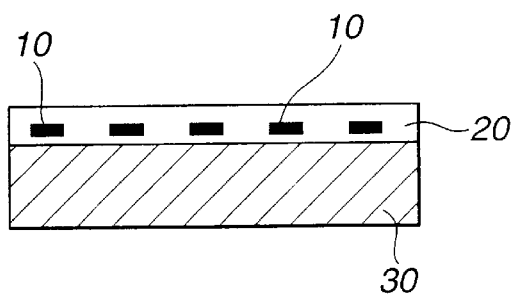
FIG. 1A is a sectional view showing a first fundamental form of a coloring structure for producing colors, according to the present invention.
Figure 2A:
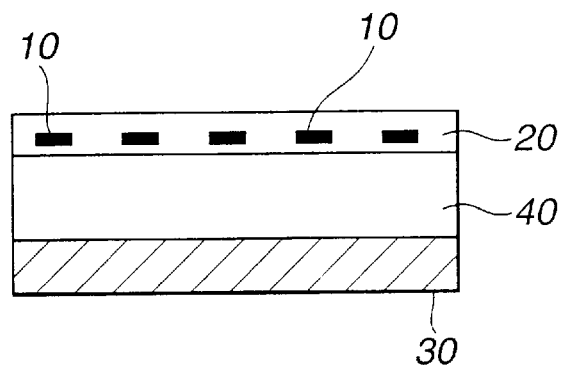
FIG. 2A is a view similar to FIG. 1A, showing a second fundamental form of the coloring structure.

Referring to FIGS. 1A and 2A, a coloring structure of the invention for producing colors is constructed fundamentally in two different forms. One form is as shown in FIG. 1A, including a light-reflecting base 30 for efficiently reflecting incident light to the incident side and a brilliant layer 20 placed thereon and containing a predetermined concentration of transparent brilliant units 10. Each brilliant unit 10 includes an alternate or regularly repeated lamination of at least two polymers having different refractive indexes as will be described later. It controls interfered light resulting from reflection and interference produced by the lamination and transmitted light other than interfered light. Another form is as shown in FIG. 2A, including light-transmitting base 40, brilliant layer 20 disposed on one surface of the base 40 and containing a predetermined concentration of brilliant units 10, and light-reflecting base 30 disposed on another surface of the base 40 and for efficiently reflecting incident light to the incident side.

The light-reflecting base 30 may be formed out of any material allowing efficient reflection of incident light to the incident side. It is desirable that a material for the base 30 is of higher average reflectance in the visible-light region. This implies that the average reflectance of the material is, preferably, 40% or more, and more preferably, 60% or more. Typical examples of materials are such that electron transfer is carried out under action of free electrons in a specific energy band of the material.

One example is metallic materials. For Al and Mg, the surface, having generally higher reflectance, absorbs only very slight part of light incident thereon, and reflects most part of light, producing white or gray. For Au and Cu, the surface absorbs light with shorter wavelength than that of green light, which causes yellow light complementary to absorbed color light to overlap light of other wavelengths, producing bright golden color. In addition to Al, Mg, Au, and Cu, available metallic materials are Ag, Cr, Ni, Ti, Fe, Zn, Pt, Rh, Ni—Cr, Au—Cu, and SUS.

Another example is semiconducting materials. Available semiconducting materials are Si, Ge, GaAs, GaP, InP, PbS, SiC, and CdS. Moreover, metallic and semiconducting materials can be used in combination.

The use of the light-reflecting base 30 allows reflection of most of incident light to the incident side without absorption as will be described later, which provides higher brilliance with enhanced lightness and saturation to viewer's eyes on the incident side. Moreover, such metallic materials applied to the base 30 show special metallic luster, providing advantageously a quality appearance as well.

The light-reflecting base 30 may be in any shape allowing efficient reflection of incident light to the incident side, and thus can be applied to various objects shaped, e.g. like film, bar, line and plane with a concave/convex and a curved surface. The thickness of the base 30 can be in either a bulk level or a thin-film level.

The surface of the light-reflecting base 30 which will contact the brilliant layer 20 is not limited to particular conditions, and may be either a diffuse-reflection surface with asperities equal to or greater than the wavelength of light wherein reflected lights travel in different directions, or a specular-reflection surface with no asperities like a mirror wherein reflected lights travel roughly in a given direction. However, in order to efficiently reflect incident light to the incident side, the base 30 on the incident side has preferably a specular-reflection surface.

With the light-reflecting base 30 having a specular-reflection surface, the strength of reflected part of incident source spectrum out of the base 30 becomes greater, thereby producing a synergistic effect of higher brilliance and enhanced lightness and saturation for the base 30.

The brilliant layer 20 placed on the light-reflecting base 30 and containing brilliant units 10 can be obtained from paint, printing ink, and light transparent adhesive. Optionally, the brilliant layer 20 may be in the form of light transparent resin. The brilliant layer 20 can be manufactured in desired shape and dimension, e.g. with known film forming technology and various molding technologies such as injection, extrusion and blow moldings.

Coating of paint containing brilliant units 10 is carried out preferably by using a spray which provides excellent efficiency. Alternately, other known coating means may be adopted such as dip, brush, roller, flow and spin coatings.

When the light-reflecting base 30 itself is thin, or the adhesion of the brilliant layer 20 to the base 30 is poor, the second form of the coloring structure as shown in FIG. 2A can be adopted, including brilliant layer 20 placed on one surface of the light-transmitting base 40, and light-reflecting base 30 placed on another surface of the base 40 and for efficiently reflecting incident light to the incident side.

With the coloring structure as shown in FIG. 2A, the light-reflecting base 30 can be in the form of ordinary bulk material or foil of metal, semiconductor and combination thereof applied directly, or thin film of metal, semiconductor and combination thereof resulting from plating or vapor evaporation.

The light-transmitting base 40 are formed, e.g. out of glass, ceramics and resin, and may be either colorless or colored on condition that it provides light transparency in the visible-light region (380–780 nm wavelength). However, as will be described later, in order to minimize attenuation of reflected part of incident light out of the light-reflecting base 30, it is preferable to use colorless and transparent materials. In view of the workability for various shaped as will be described later, the light-transmitting base 40 is formed preferably out of resin materials including thermoplastic, thermosetting, and ultraviolet-setting resins.

By the structure having brilliant layer 20 placed on the light-reflecting base 30, or the structure having brilliant layer 20 placed on one surface of the light-transmitting base 40 and light-reflecting base 30 placed on another surface, light incident on the brilliant layer 20 produces a complex effect (optical paths and synthesis thereof) due to interaction between a proper amount of brilliant units 10 contained in the brilliant layer 20 and an interface between the brilliant layer 20 and the light-reflecting base 30, providing higher brightness and enhanced lightness and saturation viewer's eyes on the incident side.

In order to make clear a distinction of the brilliant unit 10 of the coloring structure of the invention, the known brilliant unit or pearl-mica pigment will be described shortly. With the pearl-mica pigment, in order to maximize its hiding power, a base of semitransparent or non-transparent mica is coated with titanium dioxide or the like, which is covered with a metallic layer in some cases.

In the case of the semitransparent pearl-mica pigment, incident light is partly absorbed or reflected by the pigment, and mostly exits therefrom as transmitted light in the direction opposite to the incident direction, which is low in intensity and poor in transparency and purity as will be described later. On the other hand, in the case of the non-transparent pearl-mica pigment, incident light is mostly absorbed or reflected by the pigment, and hardly exits therefrom, resulting in higher hiding power. However, smaller number of multilayers of the base does not allow sufficiently high reflection intensity, failing to provide a sufficiently strong interference color. It is noted that the greater quantity of light passing trough the pearl-mice pigment, the smaller the hiding power thereof is.

The brilliant unit 10 does not aim to increase the hiding power by coating a semitransparent or non-transparent base with titanium dioxide or the like, but to minimize it. The brilliant unit 10 includes an alternate lamination of at least two transparent polymers, and makes full use of both coloring due to reflection and interference of light (interference color) and coloring due to transmission of light other than reflection and interference thereof (transmitted color) to improve the design and ornamental qualities.

Figure 1B:
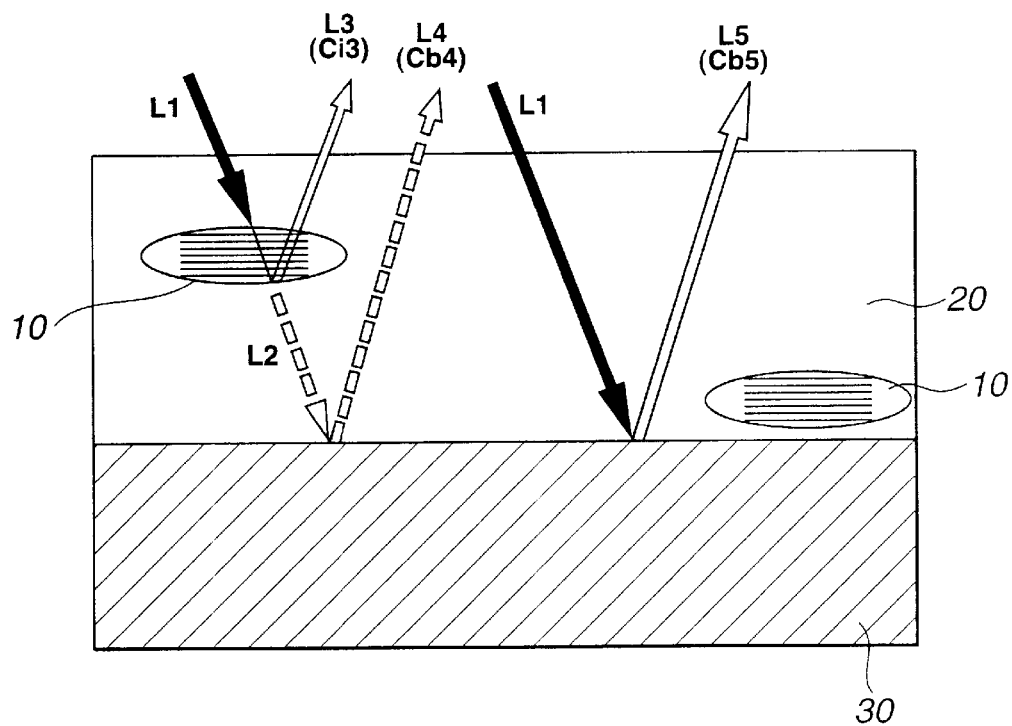
FIG. 1B is a schematic section showing a coloring mechanism of the coloring structure in FIG. 1A.

Source spectrum incident on the coloring structure of the invention containing brilliant units 10 travels in generally two optical paths. Referring to FIGS. 1A–1B, those optical paths will be described in a concretive way. Light incident on the brilliant layer 20 containing a proper amount of brilliant units 10, i.e. incident source spectrum L1, returns to the incident side along generally two paths as shown in FIG. 1B.

One of the paths is associated with interfered light L3 resulting from reflection and interference of source spectrum L1 produced by the brilliant unit 10 contained in the brilliant layer 20, and reflected light L4 resulting from reflection of transmitted light L2, i.e. part of source spectrum L1 which passed through the brilliant unit 10, produced by light-reflecting base 30.

Another of the paths is associated with reflected light L5 resulting from direct reflection of source spectrum L1 produced by the light-reflecting base 30 without any involvement of the brilliant unit 10 contained in the brilliant layer 20.

Peculiar tone presented by those lights will be described. Interfered light L3 as phase-controlled light provides a highly transparent interference color Ci3 of given wavelength $\lambda$ defined by the laminated structure of the brilliant unit 10 as will be discussed after. Moreover, source spectrum L2, part of source spectrum L1 which passed through the brilliant unit 10, is a remainder of phase-controlled interfered light L3, so that it enters, as highly transparent source spectrum, the light-reflecting base 30 with high reflecting capability, and produces thereby reflected light L4, providing a peculiar object color Cb4. Moreover, an object color Cb5 is provided by reflected light L5 resulting from direct reflection of source spectrum L1 produced by the light-reflecting base 30 without any involvement or passage through the brilliant unit 10.

In this way, when viewing the coloring structure from the incident side of source spectrum L1, a composite color of the highly transparent interference color Ci3 of interfered light L3, the highly transparent color Cb4 of reflected light L4, the object color Cb5 of reflected light L5, etc. is perceived with improved brilliance and enhanced lightness and saturation due to higher reflecting capability of the light-reflecting base 30.

As will be discussed after, when the surface of the light-reflecting base 30 has very high specular reflection-ability, it provides greater amount of reflection at a given angle for various lights such as L1 and L2 incident on the light-reflecting base 30, resulting in further brilliance, lightness and saturation when viewed from that angle.

Figure 2B:
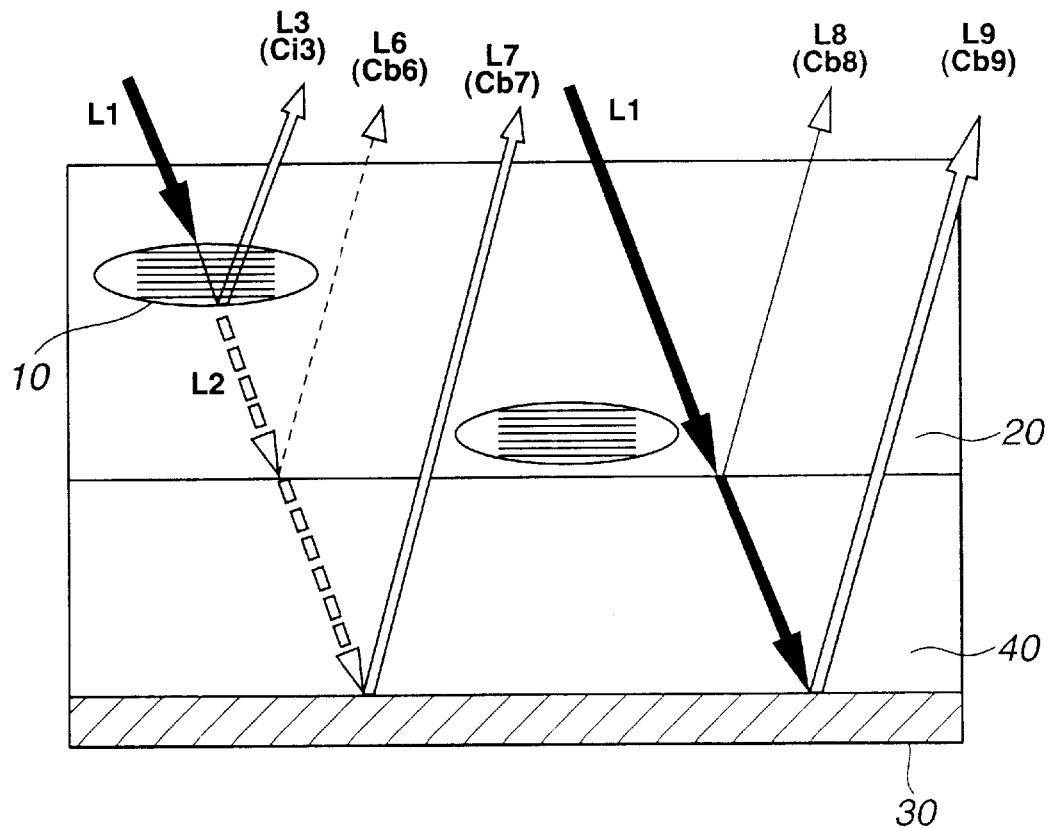
FIG. 2B is a view similar to FIG. 1B, showing a coloring mechanism of the coloring structure in FIG. 2A.

Referring to FIGS. 2A–2B, the optical paths will be described in a concretive way with regard to the second form of the coloring structure including light-transmitting base 40, brilliant layer 20 disposed on one surface of the base 40, and light-reflecting base 30 disposed on another surface of the base 40.

Light incident on the brilliant layer 20 containing a proper amount of brilliant units 10, i.e. incident source spectrum L1, returns to the incident side along the paths as shown in FIG. 2B.

One of the paths is associated with interfered light L3 resulting from reflection and interference of source spectrum L1 produced by the brilliant unit 10 contained in the brilliant layer 20, reflected light L6 resulting from reflection of transmitted light L2, i.e. part of source spectrum L1 which passed through the brilliant unit 10, produced by a boundary surface or interface between the brilliant layer 20 and the light-transmitting base 40, and reflected light L7 resulting from reflection of transmitted light L2 produced by the light-reflecting base 30 after passing through the light-transmitting base 40.

Another of the paths is associated with reflected light L8 resulting from direct reflection of source spectrum L1 produced by the boundary surface between the brilliant layer 20 and the light-transmitting base 40 without any involvement of the brilliant unit 10 contained in the brilliant layer 20, and reflected light L9 resulting from reflection of the remainder of source spectrum L1 with reflected light L8 removed after passing through the light-transmitting base 40.

Peculiar tone and visual quality presented by those lights will be described. Interfered light L3 as phase-controlled light provides highly transparent interference color Ci3 of given wavelength $\lambda$ defined by the laminated structure of the brilliant unit 10 as will be discussed after. Moreover, source spectrum L2, part of source spectrum L1 which passed through the brilliant unit 10, is a remainder of phase-controlled interfered light L3, so that it enters, as highly transparent source spectrum, the boundary surface between the brilliant layer 20 and the light-transmitting base 40. Due to the difference of refractive index between the brilliant layer 20 and the light-transmitting base 40, source spectrum L2 is partly reflected at the boundary surface to returns to the incident side as reflected light L6, providing an object color Cb6. Source spectrum L2 mostly enters the light-reflecting base 30 to produce thereby reflected light L7, providing a peculiar object color Cb7. Moreover, an object color Cb8 is provided by reflected light L8 resulting from direct reflection of source spectrum L1 produced at the boundary surface between the brilliant layer 20 and the light-transmitting base 40 without any involvement or passage through the brilliant unit 10, and an object color Cb9 is provided by reflected light L9 resulting from reflection of the remainder of source spectrum L1 with reflected light L8 removed.

In this way, when viewing the coloring structure from the incident side of source spectrum L1, a composite color of the highly transparent interference color Ci3 of interfered light L3, the highly transparent object color Cb6 of reflected light L6, the object color Cb7 of reflected light L7, the object color Cb8 of reflected light L8, the object color Cb9 of reflected light L9, etc. is perceived with improved brilliance and enhanced lightness and saturation due to higher reflecting capability of the light-reflecting base 30.

When the surface of the light-reflecting base 30 nearly provides specular reflection, it provides a considerable amount of reflection at a given angle for various lights such as L1 and L2 incident on the light-reflecting base 30, resulting in further brilliance, lightness and saturation when viewed from that angle.

The brilliant unit 10 not only produces interfered and transmitted lights, but controls them. Such "control" implies an arbitrary change both in intensity of interfered and transmitted lights (i.e. reflection intensity for interfered light and transmission intensity for transmitted light) and in peak wavelength of reflection and transmission spectra, and concerns a kind of conversion of light intensity and wavelength. This function can be enhanced by the measures as depicted, e.g. in claim 9, wherein the alternate lamination of the brilliant unit 10 includes a layer containing one of the achromatic and chromatic coloring matters.

Figure 3:
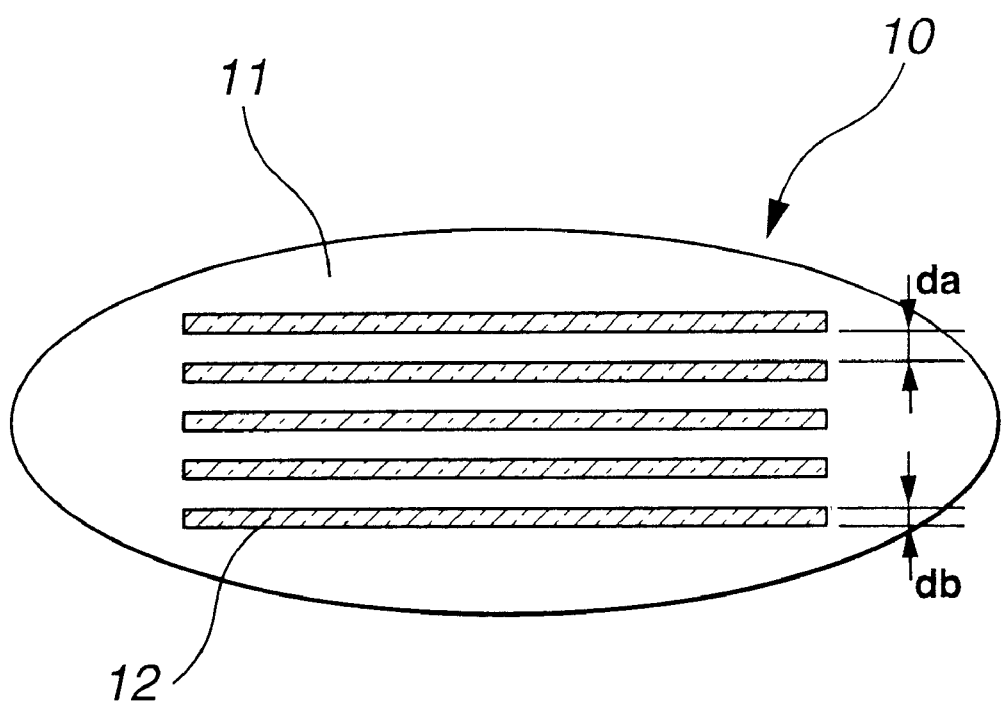
FIG. 3 is an enlarged section showing a transparent brilliant unit.

Referring to FIG. 3, the brilliant unit 10 has a section as shown in FIG. 2, including therein an alternate lamination of two polymers 11, 12, for example. Suppose that the refractive indexes of the polymers 11, 12 are na and nb, and that the thicknesses of the two are da and db. In order to obtain desired coloring or an interference color of wavelength $\lambda 1$, the primary reflection peak wavelength $\lambda 1$ should be satisfy $\lambda 1 = 2(nada+nbdb)$.

As will be described later, materials for the brilliant unit 10 generally include resins due to their low cost, excellent formability, and relatively easy designing in accordance with various applications. In connection with the refractive index of two resins to be used, it is practically preferable to pursue optical design so as to satisfy the relationship of $na \geq 1.3$, and $1.01 \leq nb/na \leq 1.40$.

Determination of the primary reflection peak wavelength $\lambda 1$ to satisfy such relationship allows not only generation of hue covering the whole color range of violet-green-red, i.e. hue corresponding to $\lambda 1$ between 0.38 and 0.78 $\mu$m, but achievement of the very strong interference color Ci3. The primary reflection peak wavelength $\lambda 1$ can be determined such that $\lambda 1 < 0.38$ $\mu$m or $\lambda 1 > 0.78$ $\mu$m. When $\lambda 1 < 0.38$ $\mu$m, light of longer wavelength than ultraviolet can efficiently be reflected to the incident side, whereas when $\lambda 1 > 0.78$ $\mu$m, light of longer wavelength than near-infrared can be.

Among the above conditions, the condition of $na \geq 1.3$ results from the material characteristics of the polymers 11, 12. The condition of $1.01 \leq nb/na$ results from the practical manufacturing condition with respect to formation of the alternate lamination of two polymers and the really visually recognizable level of tone in the visible-light region. And the condition of $nb/na \leq 1.40$ also results from the manufacturing condition with respect to formation of the alternate lamination of two polymers. In particular, when the optical thicknesses (=refractive index×thickness) of two polymer layers are the same, i.e. nada=nbdb, the greatest reflectance R is obtained.

The polymers 11, 12 for the brilliant unit 10 may be resins including polyester, polyacrylonitrile, polystyrene, nylon, polypropylene, polyvinyl alcohol, polycarbonate, polyethylene naphthalate, polyethylene terephthalate, polymethyl methacrylate, polyether etherketone, polyparaphenylene terephthal amide, polyphenylene sulfide, etc., or their copolymer resins or blended resins, among which two or more resins of different refractive indexes are selected for application.

Although the number of alternate polymer layers of the brilliant unit 10 is not limited to a specific number, it is preferably 5 or more, particularly, 10 to 150 in view of optical function (reflection/interference and transparency) and manufacture. It is noted that when applying three polymers or more, the repeated lamination of the polymers is needed in a predetermined order and without changing the order.

The brilliant units 10 including such alternate lamination can be obtained by forming an alternate-lamination workpiece on a base material in accordance with the known film forming methods, and then flaking off or chipping it. The manufacturing method may be selected from physical evaporations such as vacuum or electron evaporation, ion plating and molecular beam epitaxy, treating methods such as casting, spin coat, plasma polymerization and Langmuir-Blodgett (LB) technique, and spinning methods such as melt spinning, wet spinning and dry spinning. Among them, the melt spinning method, which has excellent productivity and allows low manufacturing cost, is particularly suited for manufacture of the brilliant units 10. With the melt spinning method, continuous or yarn-like workpieces can be obtained by using a melt composite spinning apparatus with a special spinneret for forming an alternate lamination. The workpieces are subjected to drawing treatment to secure the thermal and dynamical stability and provide desired coloring, then cut to predetermined lengths for diverse applications.

With the brilliant unit 10 in the form of, e.g. coated film, a binder for the brilliant layer 20 containing brilliant units 10 is selected non-exclusively from materials with light transparency, and, preferably, from resins with excellent film formability and coating performance. Such resins may be acrylic, alkyd, polyester, polyurethane and amino resins, and isocyanate compounds. A solvent for dissolving or diffusing the resins and a hardener may be one of the paint solvents, which include toluenen, xylene, butyl acetate, methyl acetate, methyl ethyl ketone, methyl isobutyl ketone, butyl alcohol, aliphatic hydrocarbon, aromatic hydrocarbon, etc. Moreover, water can be used for solventless paint. There is no particular limitation on the solvent.

The brilliant layer 20 for the coloring structure may contain, in addition to the brilliant unit 10, not only a known pigment such as pearl-mica or organic or inorganic pigment concurrently, but a previously applied additive agent such as dispersing agent, plasticizer, surface regulator or rust inhibitor. However, adding of the organic or inorganic pigment is preferably avoided due to possible occurrence of muddiness or cloudiness of hue.

In one embodiment of the present invention, a colored layer 50 containing an ordinary pearl-mica or organic or inorganic pigment may be placed on the brilliant layer 20 containing brilliant units 10, which is not advantageous, however, in view of higher brilliance and enhanced lightness and saturation which the present invention aims at.

With the coloring structure of the invention, as depicted, e.g. in claim 9, the alternate lamination of the brilliant unit 10 may include a layer containing one of the achromatic and chromatic coloring matters. This allows control of the intensity or transmittance and the wavelength of light passing through the brilliant unit 10. It is noted that the achromatic colors are colors without hue but with only lightness of the three attributes of the color (hue, lightness and saturation), including white, gray and black. On the other hand, the chromatic colors are colors other than the achromatic colors and with the three attributes of the color.

Figure 4A:
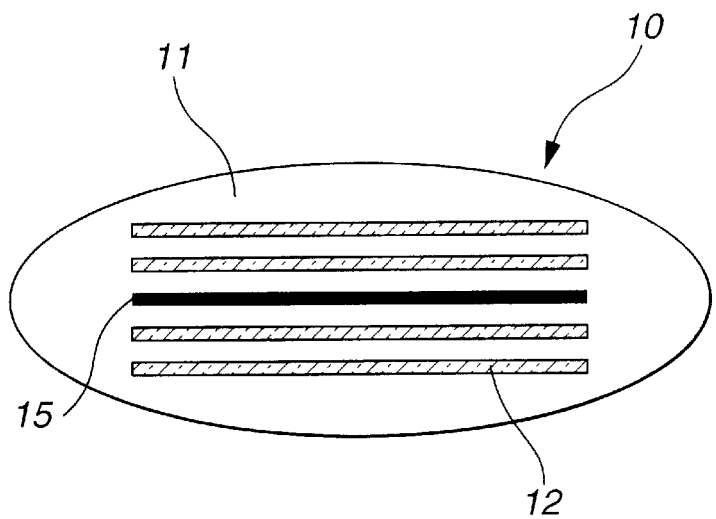
FIG. 4A is a view similar to FIG. 3, showing another transparent brilliant unit with an achromatic-coloring-matter layer.
Figure 4B:
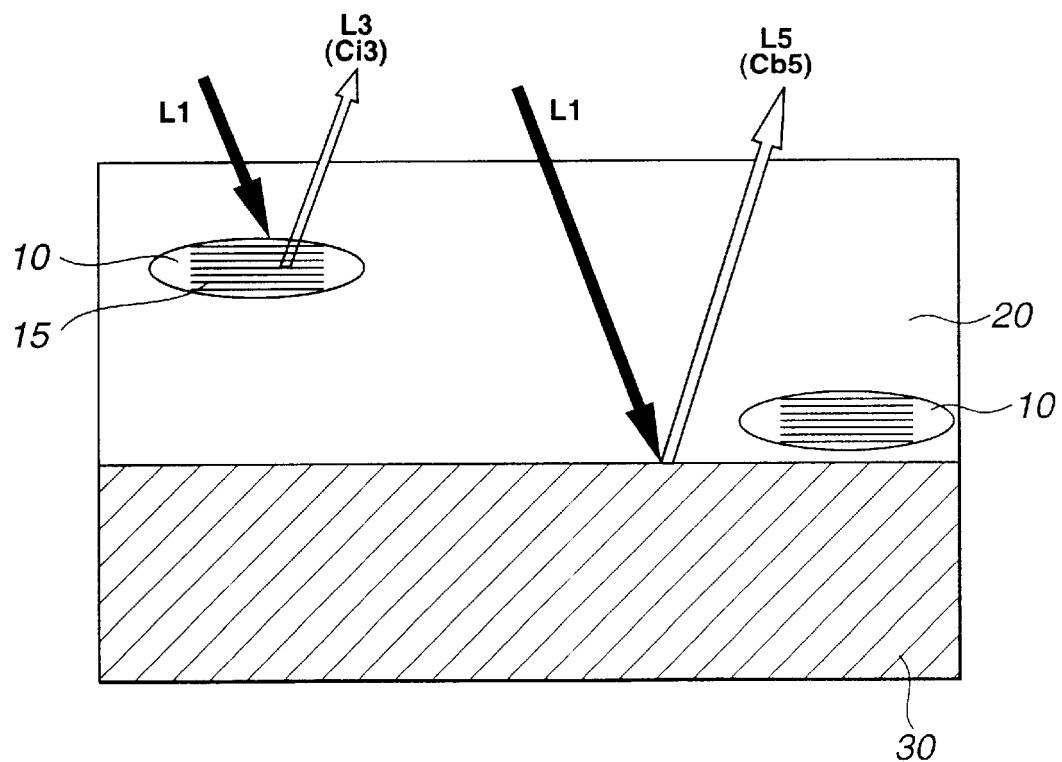
FIG. 4B is a view similar to 2B, showing a coloring mechanism of the coloring structure in FIG. 4A.

FIGS. 4A–4B show a coloring structure and a coloring mechanism thereof, respectively, wherein the coloring structure includes brilliant layer 20 containing brilliant units 10 each with a stray-light absorbing layer 15 including an achromatic or black coloring matter for absorbing substantially 100% transmitted light. Incident source spectrum L1 is partly reflected by the brilliant unit 10, which forms interfered light L3, producing the interference color Ci3. Light other than interfered light L3 is absorbed by the stray-light absorbing layer or achromatic-coloring-matter layer 15. Moreover, the object color Cb5 is provided by reflected light L5 resulting from direct reflection of source spectrum L1 produced by the light-reflecting base 30 without any involvement of the brilliant unit 10 contained in the brilliant layer 20.

Therefore, when viewing the coloring structure from the side of source spectrum L1, viewer's eyes receive different colors as stimuli due to multiple reflection between the brilliant units 10, but nevertheless perceive generally an additive mixture of the interference color Ci3 and the object color Cb5. Specifically, due to the stray-light absorbing layer 15 included in the laminated layers of the brilliant unit 10, light L2 passing through the brilliant unit 10 is mostly intercepted to accentuate the interference color Ci3, obtaining higher brilliance and more delicate change in hue than those of the laminated layers with no stray-light absorbing layer 15.

Figure 5A:
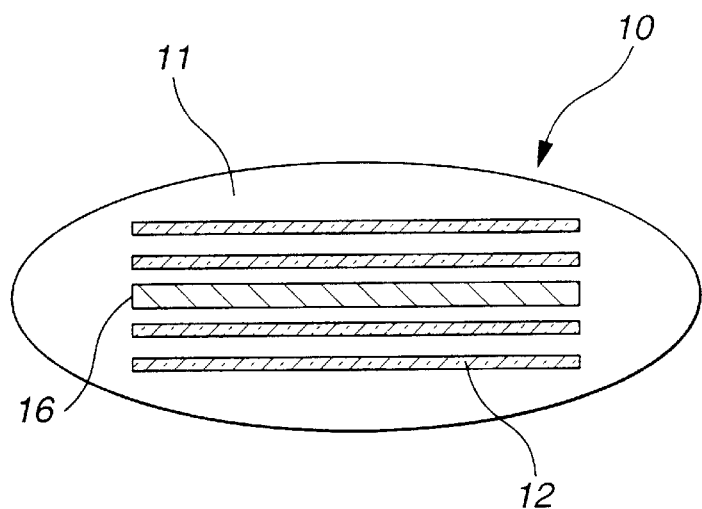
FIG. 5A is a view similar to FIG. 4A, showing still another transparent brilliant unit with a chromatic-coloring-matter layer.
Figure 5B:
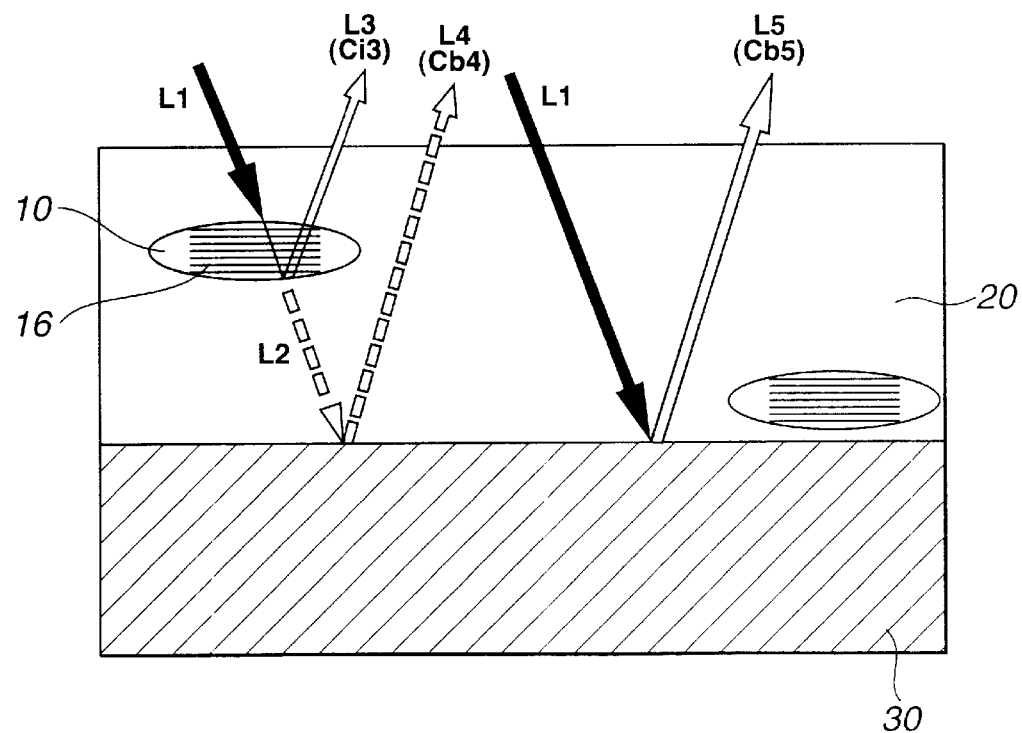
FIG. 5B is a view similar to FIG. 4B, showing a coloring mechanism of the coloring structure in FIG. 5A.

FIGS. 5A–5B show a coloring structure and a coloring mechanism thereof, respectively, wherein the coloring structure includes brilliant layer 20 containing brilliant units 10 each with a chromatic-coloring-matter layer 16 in the alternate lamination. Incident source spectrum L1 is partly reflected by the brilliant unit 10 to form interfered light L3, providing the interference color Ci3. Light other than interfered light L3 is absorbed by the chromatic-coloring-matter layer 16 at a given wavelength. The remainder of light or transmitted light L2 is reflected by the light-reflecting base 30 to form reflected light L4, presenting the object color Cb4. Moreover, the object color Cb5 is provided by reflected light L5 resulting from direct reflection of source spectrum L1 produced by the light-reflecting base 30 without any involvement of the brilliant unit 10. In this way, when using the brilliant layer 20 containing brilliant units 10 each with chromatic-coloring-matter layer 16, viewer's eyes receive different colors as stimuli due to multiple reflection between the brilliant units 10, but nevertheless perceive generally an additive mixture of the three colors.

The use of an achromatic coloring matter having a certain degree of light transparency, such as gray pigment, in place of a chromatic coloring matter, allows control of the intensity of transmitted light L2.

Figure 6A:
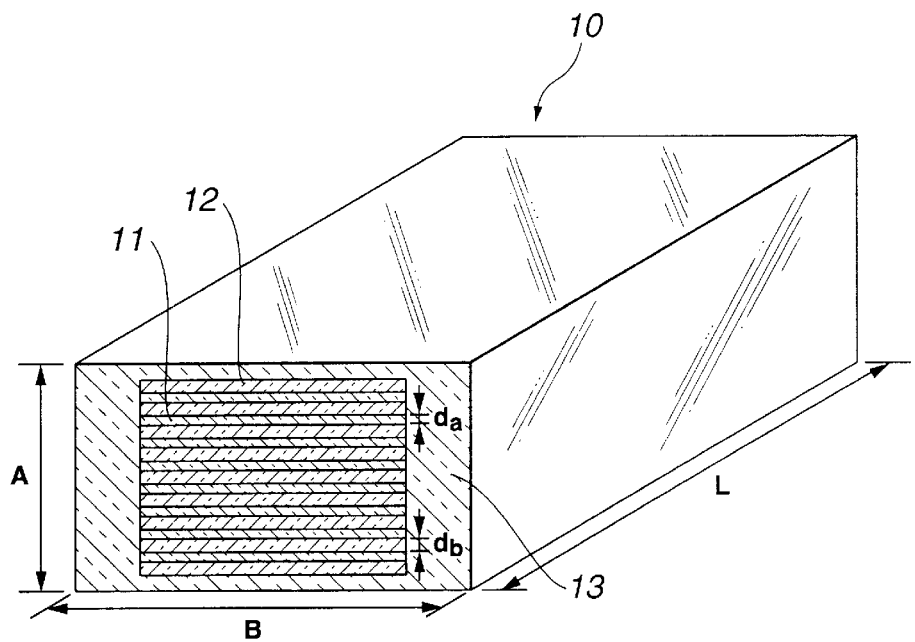
FIG. 6A is a perspective view showing a prism-shaped transparent brilliant unit with a clad layer.
Figure 6B:
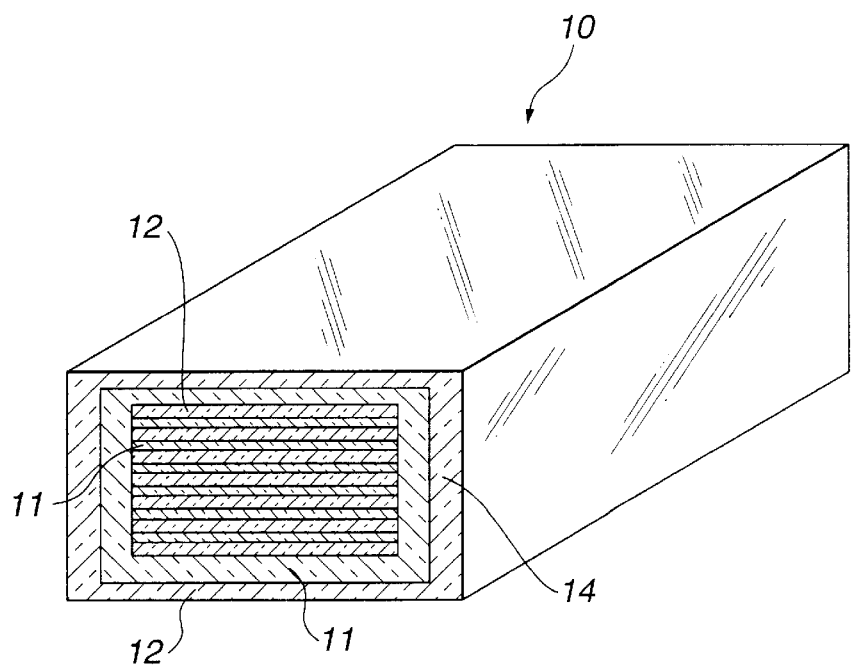
FIG. 6B is a view similar to FIG. 6A, showing another prism-shaped transparent brilliant unit with a double clad layer.

Referring to FIG. 6A, though the outer structure of the brilliant unit 10 is not limited to a specific structure, it includes preferably a clad layer 13 comprising one of the polymers 11, 12 or a third polymer different therefrom in view of improvement in mechanical strength such as prevention of peeling and wear resistance of the lamination. Optionally, referring to FIG. 6B, a double-clad layer 14 may be arranged, which includes a combination of the polymers 11, 12, i.e. the first polymer 11 and the second polymer 12 arranged therearound.

The shape of the brilliant unit 10 is determined preferably, as depicted, e.g. in claim 11, such that the brilliant unit 10 is of a rectangular section as shown in FIG. 6A, wherein the ratio of a length A of a side of the section perpendicular to a surface of the alternate lamination to a length B of a side of the section parallel to the surface of the alternate lamination is between 0.8 and 25.0, and the ratio of the length A to a length L of the brilliant unit 10 is between 0.8 and 4,000. This allows full achievement of coloring due to reflection and interference of light without deteriorating the productivity and coating-ability of the brilliant units 10.

Specifically, if the ratio of the length A to the length B, and the ratio of the length A to the length L are both smaller than 0.8, the brilliant unit 10 has low probability that the reflecting and interfering surface points in the direction of incident light when placing the brilliant layer 20 containing brilliant units 10 on the base 30, particularly, by coating, resulting in insufficient coloring effect due to reflection and interference of light. If the ratio of the length A to the length B is greater than 25, there will arise a problem during manufacture of the brilliant units 10, that the brilliant units 10 producing light with a given wavelength cannot be obtained in a stable way. If the ratio of the length A to the length L is greater than 4,000, a spray gun may be clogged with the brilliant units 10 during coating, leading to impossible continuation of normal coating.

In view of compromise between the reflection and interference effect, the coating performance and the dispersibility during formation of films, fibers and articles, the content of the brilliant units 10 in the coloring structure is determined preferably, as depicted, e.g. in claim 12, such that the brilliant layer 20 contains 0.1–30.0% brilliant units 10 by mass. Specifically, if the content of the brilliant units 10 is smaller than 0.1%, few coloring elements exist in the brilliant layer 20, leading to difficult achievement of hue varying with the angle, transparency and profundity. On the other hand, if the content is greater than 30%, the concentration exceeds a value set for conventional coating films and resin products, having a tendency to exert a bad influence on the properties of coating films and resin products such as spreadability and bendability.

With the coloring structure of the invention, as depicted, e.g. in claim 3, the surface of the light-reflecting base 30 has preferably a specular reflection-ability like a mirror in view of efficient reflection of incident light. This design allows the coloring structure to provide stronger reflection and higher brilliance to viewer's eyes positioned on the incident side.

With the coloring structure of the invention, as depicted, e.g. in claim 4, the brilliant layer 20 can include a plurality of coating films or resin layers each containing a proper amount of brilliant units 10 and placed on the light-reflecting base 30 to secure the layer thickness, which induces an effect of depth and three dimensions when viewing the coloring structure from the incident side. Optionally, a plurality of coating films or resin layers containing respective brilliant units 10 having different lengths may be placed on the light-reflecting base 30 so that the brilliant unit 10 contained in the upper coating film or resin layer close to the incident side is greater in length than that contained in the lower coating film or resin layer close to the light-reflecting base 30. This leads to a further improvement in profundity and depth of the coloring structure.

Moreover, with the coloring structure of the invention, as depicted, e.g. in claim 5, when the brilliant layer 20 includes a plurality of coating films or resin layers containing a proper amount of brilliant units 10 and placed on the light-reflecting base 30, the brilliant units 10 in the respective coating films or resin layers can be designed to produce different colors. This allows achievement of hue and composite visual quality different from those of the conventional coloring structures with a combination of achromatic and chromatic pigments, etc.

By way of example, by using the brilliant units 10 producing different colors, i.e. blue (B), green (G) and red (R), and placing the brilliant layers containing such brilliant units 10 successively, i.e. in B-G-R order, different colorings with transparency can be obtained by varying the content of brilliant units 10. When obtaining a lamination by using the conventional achromatic and chromatic pigments, tone of the lamination will be turbid, and not transparent as is apparent in paints. The coloring structure of the invention relies upon three primary colors resulting from interference of light, allowing generation of highly transparent tone. For additional information, when the brilliant layers containing brilliant units 10 include three layers for producing B, G and R as described above, adjustment of the coloring intensity of each layer allows generation of all colors including transparent white (W). It is noted that B+G+R=W.

Moreover, with the coloring structure of the invention, as depicted, e.g. in claim 6, different transparent tones can be obtained in the same way as described above by containing in a single brilliant layer groups of brilliant units 10 producing different colors, and adjusting the ratio of amount between the groups.

Furthermore, as depicted, e.g. in claim 8, a layer with light transparency is provided preferably on the brilliant layer 20 containing brilliant units 10, which increases luster and durability of the brilliant layer 20.

Further, as depicted, e.g. in claim 13, an adhesive layer may be provided on at least part of the lower face of the light-reflecting base 30 with respect to the side of incident source spectrum L1, which allows fixing of the coloring structure to a base of various shapes and materials, contributing to further expansion of the scope of application of the coloring structure.

Figure 7A:
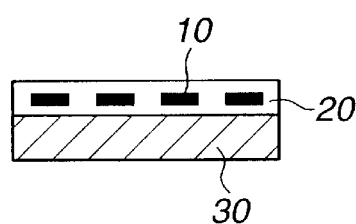
FIGS. 7A–7F are views similar to FIG. 4A, showing illustrative examples of the coloring structure.

Referring to FIGS. 7A–9B, various examples of the coloring structure of the invention will be described. The fundamental form of the coloring structure is as shown in FIG. 7A (see also FIG. 1A), including light-reflecting base 30 and brilliant layer 20 placed thereon and containing a proper amount of brilliant units 10. Preferably, a transparent layer 50 is placed on the brilliant layer 20 as shown in FIGS. 7B, 7D, 7F and 8A–8C to increase surface luster of the coloring structure and durability of the brilliant layer 20. It is noted that in the coating structure, the transparent layer 50 corresponds to a clear coating layer so called.

Figure 7B:
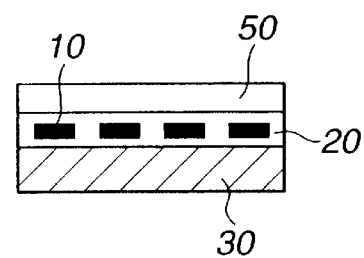
Figure 7C:
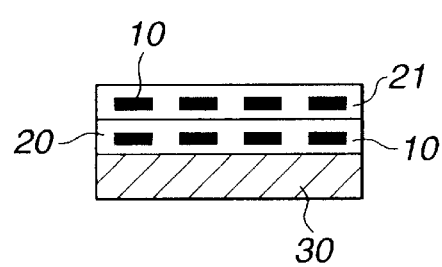

Optionally, as shown in FIG. 7C, a plurality of brilliant layers 20, 21 containing brilliant units 10 may be placed on the light-reflecting base 30. In this alternative, the brilliant units 10 contained in the brilliant layers 20, 21 can be of different lengths so that the brilliant unit 10 contained in the upper layer 21 is greater in length than that contained in the lower layer 20. This leads to an improvement in profundity and depth of the coloring structure.

Figure 7D:
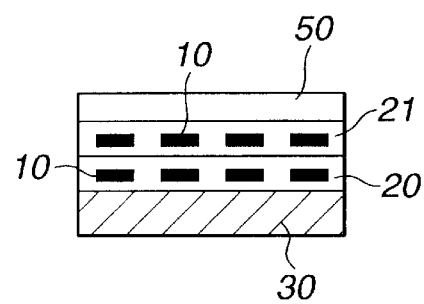
Figure 7E:
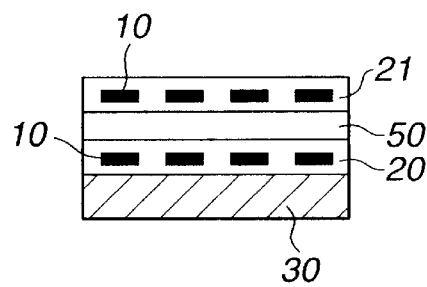
Figure 7F:
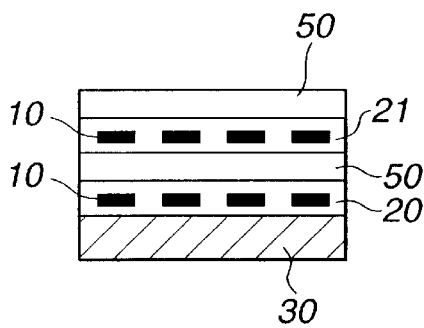

Optionally, as shown in FIG. 7D, the transparent layer 50 may be placed on the two brilliant layers 20, 21, which contributes to an improvement both in profundity and depth, but in surface luster of the coloring structure. Instead of being placed on the two brilliant layers 20, 21, the transparent layer 50 may be interposed between the two, which enhances lightness, saturation, and a certain degree of profundity of the coloring structure. Alternatively, as shown in FIG. 7F, the transparent layer 50 may be disposed on the structure as shown in FIG. 7E.

Figure 8A:
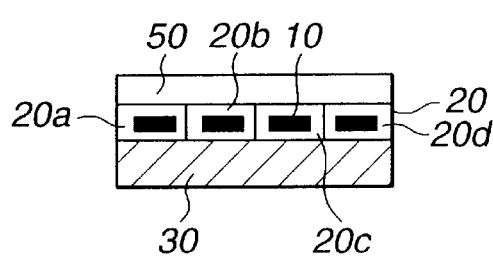
FIGS. 8A–8D are views similar to FIG. 7F, showing other illustrative examples of the coloring structure.
Figure 8B:
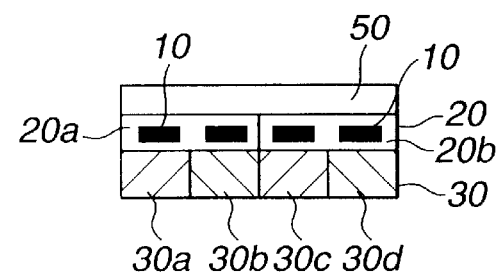

FIGS. 8A–8D show variations of the above coloring structures. Specifically, FIG. 8A illustrates brilliant layer 20 containing brilliant units 10 composed of a plurality of portions 20a–20d producing different interference colors or having different contents of brilliant units 10. FIG. 8B illustrates light-reflecting base 30 composed of a plurality of portions 30a–30d having different light reflection capabilities such as reflectance, shape of reflection spectrum, luster, etc.

Figure 8C:
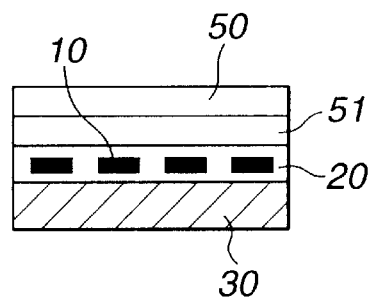
Figure 8D:
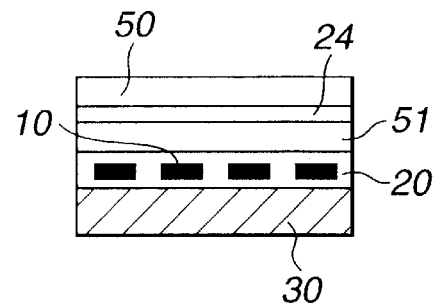

Optionally, as shown in FIG. 8C, for enhancement of luster, a plurality of transparent layers 50, 51 can be arranged to increase the layer thickness. It is acknowledged that in the coating structure, increasing the thickness of clear coating layers tends generally to decrease the adhesion therebetween. For preventing this, a transparent base 24 with excellent adhesive property may be interposed between the transparent layers 50, 51 as shown in FIG. 8D.

Figure 9A:
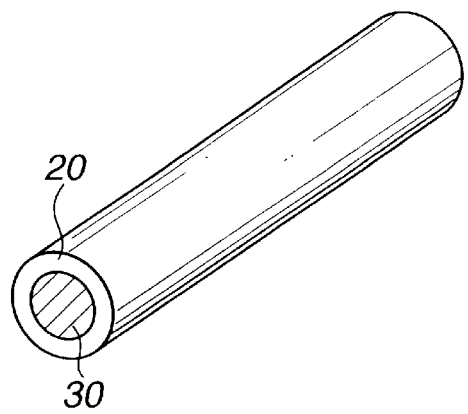
FIGS. 9A–9B are views similar to FIG. 6B, showing further illustrative examples of the coloring structure.
Figure 9B:
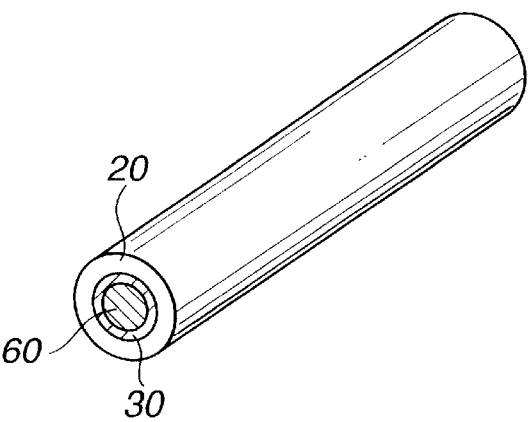

Alternatively, as shown in FIGS. 9A–9B, the brilliant layer 20 may be arranged around the non-planar, e.g. linear, light-reflecting base 30. In this alternative, another base 60 may be arranged inside the light-reflecting base 30. It is understood that as discussed above, the brilliant layer 20 can be either colorless or colored on condition that it provides light transparency.

When using colored transparent layer 50, the coloring structure tends to produce more intense color, providing more remarkable profundity for visual quality. Arrangement of the transparent layer 50 as one of the layers of the coloring structure allows further improvement not only in brilliance, but in lightness, saturation and a certain degree of profundity.

The present invention will be described in a more concretive way with regard to preferred embodiments 1–12.

Embodiment 1

The coloring structure as shown in FIG. 7A is formed, including light-reflecting base 30 for efficiently reflecting incident light to the incident side and brilliant layer 20 placed thereon. For the brilliant unit 10 contained in the brilliant layer 20, by using polyethylene naphthalate (PEN) of 1.63 refractive index as the first polymer 11 and nylon 6 (Ny-6) of 1.53 refractive index as the second polymer 12, the alternate lamination of the polymers 11, 12 of 30 layers each is formed, which is surrounded by the clad layer 13 of PEN, obtaining the brilliant unit 10 as shown in FIG. 7A, which produces blue as an interference color and wherein the thickness da of the first polymer 11 is equal to 0.072 $\mu$m, and the thickness db of the second polymer 12 is equal to 0.077 $\mu$m. The dimensional ratio of the brilliant unit 10 is determined such that the ratio of the length A to the length B is between 4 and 5, and the ratio of the length A to the length L is between 15 and 20 (see FIG. 6A).

Paint is prepared by mixing the brilliant units 10 in two-liquid acrylic-urethane base paint known under the trade name of "R-241 Base" manufactured by NIPPON BEE CHEMICAL, CO., LTD. to have 10 mass % with respect to the entire coating film. Paint prepared in this way is diluted with acrylic-urethane thinner known under the trade name of "T-801 Thinner" manufactured by NIPPON BEE CHEMICAL, CO., LTD. to have about 11–12 sec. viscosity in terms of Ford cup #4. Diluted paint is applied on a commercially available Al plate for light-reflecting base 30 to have 15–20 $\mu$m thickness, the Al plate having 2.5 mm thickness, surface treated and 70% average reflectance and being degreased and then ultrasonically cleaned with acetone or isopropyl alcohol. The workpiece is subjected to baking during 20 min. at 80° C. to form brilliant layer 20, obtaining the coloring structure.

Embodiment 2

The brilliant layer or coating layer 20 is obtained by applying paint used in the embodiment 1 on a commercially available Al plate for light-reflecting base 30. Acrylic-urethane clear paint known under the trade name of "R-246 Clear" manufactured by NIPPON BEE CHEMICAL, CO., LTD is diluted with acrylic-urethane thinner known under the trade name of "T-801 Thinner" manufactured by NIPPON BEE CHEMICAL, CO., LTD. to have about 12–13 sec. viscosity in terms of Ford cup #4. Diluted paint is applied on the Al plate in a wet-on-wet way to have 30–35 μm thickness. The workpiece is subjected to baking during 20 min. at 80° C. to form clear coating layer or transparent layer 50 on the brilliant layer 20, obtaining the coloring structure as shown in FIG. 7B.

Embodiment 3

In the same way as in the embodiment 1, the brilliant layer or first coating layer 20 containing brilliant units 10 is obtained on a commercially available Al plate for light-reflecting base 30. Then, the brilliant layer or second coating layer 21 is formed in the same way as the first coating layer 20. Specifically, paint is prepared by mixing the brilliant units 10 of larger length L than those in the first coating layer 20 in the two-liquid acrylic-urethane base paint to have 10 mass % with respect to the entire coating film. Brilliant unit 10 is used wherein the ratio of the length A to the length B is between 4 and 5, and the ratio of the length A to the length L is between 25 and 35 (see FIG. 6A). Paint prepared in this way is diluted with the acrylic-urethane thinner to have about 11–12 sec. viscosity in terms of Ford cup #4. Diluted paint is applied on the first coating layer 20 to have 15–20 μm thickness, which is subjected to baking during 20 min. at 80° C. to form brilliant layer or second coating layer 21, obtaining the coloring structure shown in FIG. 7C and including two coating layers 20, 21 which contain respective brilliant units 10 of different lengths.

Embodiment 4

In the same way as in the embodiment 3, the second coating layer 21 is applied on the first coating layer 20, which is then applied with the acrylic-urethane clear paint used in the embodiment 2 in a wet-on-wet way to have 30–35 μm thickness. The workpiece is subjected to baking during 20 min. at 80° C. to form clear coating layer or transparent layer 50 on the brilliant layers 20, 21, obtaining the coloring structure shown in FIG. 7D.

Embodiment 5

In the same way as in the embodiment 2, the brilliant layer or first coating layer 20 containing brilliant units 10 and the transparent layer or clear coating layer 50 are placed on a commercially available Al plate for light-reflecting base 30. Then, paint containing longer brilliant units 10 used in the embodiment 3 is applied on the clear coating layer 50 to have 15–20 μm thickness. The workpiece is subjected to baking during 20 min. at 80° C. to form second coating layer 21 on the clear coating layer 50, obtaining the coloring structure as shown in FIG. 7E.

Embodiment 6

In the same way as in the embodiment 5, the brilliant layer or first coating layer 20 containing shorter brilliant units 10 is placed on a commercially available Al plate for light-reflecting base 30, on which the transparent layer or clear coating layer 50 is placed. Moreover, the brilliant layer or second coating layer 21 containing longer brilliant units 10 is applied on the clear coating layer 50. Furthermore, the acrylic-urethane clear paint used in the embodiment 2 is applied on the second coating layer 21 in a wet-on-wet way to have 30–35 μm thickness. The workpiece is subjected to baking during 20 min. at 80° C. to form clear coating layer or transparent layer 50 on the second coating layer 21, obtaining the coloring structure shown in FIG. 7F.

Embodiment 7

In the same way as in the embodiment 1, the brilliant unit 10 is formed wherein the ratio of the length A to the length B is between 2 and 3, and the ratio of the length A to the length L is between 15 and 20 (see FIG. 6A). Paint prepared by using the two-liquid acrylic-urethane base paint and the acrylic-urethane thinner used in the embodiment 1 is applied on a commercially available Al plate for light-reflecting base 30, which is then subjected to the same baking to form brilliant layer or coating layer 20, obtaining the coloring structure as shown in FIG. 7A.

Embodiment 8

In the same way as in the embodiment 1, the brilliant unit 10 is formed wherein the ratio of the length A to the length B is between 4 and 5, and the ratio of the length A to the length L is between 1 and 3 (see FIG. 6A). Paint prepared by using the two-liquid acrylic-urethane base paint and the acrylic-urethane thinner used in the embodiment 1 is applied on a commercially available Al plate for light-reflecting base 30, which is then subjected to the same baking to form brilliant layer or coating layer 20, obtaining the coloring structure as shown in FIG. 7A.

Embodiment 9

The brilliant units 10 (A=1, B=4 to 5, L=15 to 20) used in the embodiment 1 are mixed into the two-liquid acrylic-urethane base paint to have 1 mass % with respect to the entire coating film, which is diluted with the acrylic-urethane thinner to have the same viscosity. Diluted paint is applied on a commercially available Al plate for light-reflecting base 30 to have the same thickness. The clear paint is applied thereon in the same way as in the embodiment 2 to form transparent layer 50, which is subjected to baking, obtaining the coloring structure as shown in FIG. 7B.

Embodiment 10

The brilliant units 10 (A=1, B=4 to 5, L=15 to 20) used in the embodiment 1 are mixed into the two-liquid acrylic-urethane base paint to have 28 mass % with respect to the entire coating film, which is diluted with the acrylic-urethane thinner to have the same viscosity. Diluted paint is applied on a commercially available Al plate for light-reflecting base 30 to have the same thickness. The clear paint is applied thereon in the same way as in the embodiment 2 to form transparent layer 50, which is subjected to baking, obtaining the coloring structure as shown in FIG. 7B.

Embodiment 11

The brilliant units 10 (A=1, B=4 to 5, L=15 to 20) used in the embodiment 1 are mixed into the two-liquid acrylic-urethane base paint to have 28 mass % with respect to the entire coating film, which is diluted with the acrylic-urethane thinner to have the same viscosity. Diluted paint is applied on a commercially available glass plate for light-transmitting base 40 to have the same thickness, the glass plate having 2.5 mm thickness and 94% average transmittance in the visible-light region. The workpiece is subjected to baking to form brilliant layer 10, obtaining the coloring structure as shown in FIG. 2A. The light-reflecting base 30 includes an Al-evaporated film of 2 $\mu$m thickness and 80% average reflectance formed on a lower face of the glass plate. Before vacuum evaporation, the lower face of the glass plate is degreased and ultrasonically cleaned.

Embodiment 12

The brilliant units 10 (A=1, B=4 to 5, L=15 to 20) used in the embodiment 1 are mixed into the two-liquid acrylic-urethane base paint to have 28 mass % with respect to the entire coating film, which is diluted with the acrylic-urethane thinner to have the same viscosity. Diluted paint is applied on a commercially available glass plate for light-transmitting base 40 to have the same thickness, the glass plate having 2.5 mm thickness and 94% average transmittance in the visible-light region. Moreover, clear coating layer or transparent layer 50 is placed thereon in the same way as in the embodiment 2, which is subjected to baking, obtaining the coloring structure comprising transparent layer 50 placed on brilliant layer 20 as shown in FIG. 2A. The light-reflecting base 30 includes an Au-evaporated film of 2 $\mu$m thickness and 80% average reflectance formed on a lower face of the glass plate. Before vacuum evaporation, the lower face of the glass plate is degreased and ultrasonically cleaned.

COMPARATIVE EXAMPLE 1

Paint used in the embodiment 1 is applied on a surface of a color base of black ABS resin in place of the light-reflecting base 30, forming brilliant layer or coating layer 20. Moreover, the transparent layer or clear coating layer 50 is placed thereon to obtain the coloring structure.

COMPARATIVE EXAMPLE 2

In the same way as in the embodiment 2, the brilliant layer 20 containing brilliant units 10 is placed on a commercially available Al plate having 2.5 mm thickness, surface non-treated and 30% average reflectance. Moreover, clear coating layer or transparent layer 50 is placed thereon to obtain the coloring structure.

COMPARATIVE EXAMPLE 3

In the same way as in the embodiment 2, the brilliant layer 20 containing brilliant units 10 is placed on a commercially available glass plate having 2.5 mm thickness and 94% average transmittance in the visible-light region. Moreover, clear coating layer or transparent layer 50 is placed thereon.

Silver-metallic two-liquid acrylic-urethane base paint known under the trade name of "R-241BKLO Base" manufactured by NIPPON BEE CHEMICAL, CO., LTD. is diluted with the acrylic-urethane thinner to have the same viscosity. Diluted paint is applied on a lower face of the glass plate, which is subjected to baking, obtaining the coloring structure including color-base layer in place of the light-reflecting base 30.

Performance Evaluations

The performance of the coloring structures of the embodiments 1–12 and comparative examples 1–3 is evaluated with regard to the following items. The results of evaluations are shown in FIG. 10.

1) Appearance: evaluated visually by 5 subjects;

2) Tone and reflectance: evaluated based on reflection-spectrum measurement and chromaticity coordinates by using a three dimensional calorimeter with measuring wavelength $\lambda$=380 to 780 nm, manufactured by NISSAN MOTOR, CO., LTD.;

3) Lightness (V) and saturation (C): evaluated by applying the above results to Munsell color system or VHC space; and 4) Brilliance: evaluated visually by 5 subjects on a scale of 1 to 5.

From the results shown in FIG. 10, it is confirmed that the coloring structures of the illustrative embodiments provide not only enhanced brilliance, but significantly improved lightness and saturation, wherein the brilliant layer 20 containing brilliant units 10 having alternate lamination of polymers of different refractive indexes and a predetermined dimensional ratio is arranged solely or together with the transparent layer 50 or the light-transmitting layer 40 on the light-reflecting base 30 of Al plate or Au-evaporated film of higher reflectance. On the other hand, the coloring structures of the comparative examples provide poor appearance and insufficient brilliance, wherein the brilliant layer 20 and/or the transparent layer 50 is arranged on a color base of ABS resin or acrylic-urethane base paint or a non-treated surface Al plate of lower reflectance.

The entire contents of Japanese Patent Application P2000-170820 filed Jun. 7, 2000 is incorporated herein by reference.

Having described the present invention with regard to the preferred embodiments or examples, the present invention is not limited thereto, and various changes and modifications can be made without departing from the scope of the present invention.

What is claimed is:

1. A structure for producing colors by reflection and interference of a light incident thereon, comprising:
    a first base that reflects the light to an incident side;
    a second base placed on the first base, the second base having light transparency;
    a brilliant layer placed on the second base; and
    a plurality of transparent brilliant units dispersedly contained in the brilliant layer, each brilliant unit comprising an alternate lamination of at least two polymers having different refractive indexes, the alternate lamination producing an interfered light resulting from reflection and interference of the light and a transmitted light resulting from transmission of the light, each brilliant unit controlling the interfered light and the transmitted light,
    whereby the structure is provided with a coloring mechanism for producing at least an interference color resulting from the interfered light, a first object color resulting from reflection of the transmitted light produced by an interface between the brilliant layer and the second base, a second object color resulting from reflection of the transmitted light produced by the first base, a third object color resulting from reflection of the light produced by the interface without striking any brilliant units, and a fourth object color resulting from reflection of the light produced by the first base without striking any brilliant units.

2. The structure as claimed in claim 1, wherein the first base comprises one of a metallic material, a semiconducting material, and a combination of the materials.

3. The structure as claimed in claim 2, wherein the first base provides a specular reflection-ability.

4. The structure as claimed in claim 1, further comprising another brilliant layer placed on the brilliant layer and dispersedly containing the brilliant units.

5. The structure as claimed in claim 4, wherein the brilliant units contained in the respective brilliant layers produce different interference colors.

6. The structure as claimed in claim 5, wherein the brilliant units contained in each brilliant layer produce different interference colors.

7. The structure as claimed in claim 6, wherein the brilliant units are spaced to allow direct transmission of the light through the structure.

8. The structure as claimed in claim 4, further comprising a transparent layer placed on the brilliant layer.

9. The structure as claimed in claim 8, further comprising an adhesive layer provided on at least part of a face of the first base opposite to the brilliant layer.

10. The structure as claimed in claim 4, wherein each brilliant layer contains 0.1–30.0% brilliant units by mass.

11. The structure as claimed in claim 1, wherein the alternate lamination of each brilliant unit comprises a colored layer containing one of achromatic and chromatic coloring matters.

12. The structure as claimed in claim 1, wherein each brilliant unit comprises a clad layer arranged around the alternate lamination, the clad layer being formed out of one of the two polymers, a polymer other than the two polymers, and a combination of the three polymers.

13. The structure as claimed in claim 12, wherein each brilliant unit is of a substantially rectangular section, wherein the ratio of a first length of a side of the section perpendicular to a surface of the alternate lamination to a second length of a side of the section parallel to the surface of the alternate lamination is between 0.8 and 25.0, and the ratio of the first length to a length of each brilliant unit is between 0.8 and 4,000.

14. The structure as claimed in claim 1, wherein the second base comprises one of glass, ceramics, and resin.

* * * * *